United States Patent
Neupert et al.

(10) Patent No.: US 7,040,650 B2
(45) Date of Patent: May 9, 2006

(54) GAS BAG FOR A VEHICLE OCCUPANT RESTRAINT SYSTEM

(75) Inventors: Ralph Neupert, Kleinwallstadt (DE); Michael Lehmann, Aschaffenburg (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 146 days.

(21) Appl. No.: 10/151,494

(22) Filed: May 20, 2002

(65) Prior Publication Data

US 2002/0185846 A1 Dec. 12, 2002

(30) Foreign Application Priority Data

Jun. 8, 2001 (DE) ................................. 201 09 596 U

(51) Int. Cl.
*B60R 21/24* (2006.01)

(52) U.S. Cl. ................. 280/729; 280/731; 280/732

(58) Field of Classification Search ............... 280/729, 280/731, 732
See application file for complete search history.

(56) References Cited

U.S. PATENT DOCUMENTS

| | | | |
|---|---|---|---|
| 3,473,824 A | | 10/1969 | Carey et al. |
| 4,300,894 A | * | 11/1981 | Cumming et al. ......... 493/210 |
| 5,044,663 A | | 9/1991 | Seizert |
| 5,174,599 A | * | 12/1992 | Hull et al. ................. 280/731 |
| 5,489,119 A | * | 2/1996 | Prescaro et al. ......... 280/743.2 |
| 5,609,363 A | * | 3/1997 | Finelli .................... 280/743.2 |
| 5,722,685 A | * | 3/1998 | Eyrainer ................. 280/730.2 |
| 6,334,627 B1 | * | 1/2002 | Heym et al. ............. 280/743.2 |
| 6,431,599 B1 | * | 8/2002 | Bohn ...................... 280/743.1 |
| 6,502,858 B1 | * | 1/2003 | Amamori ................ 280/743.2 |
| 6,554,317 B1 | * | 4/2003 | Lorenz et al. ........... 280/743.1 |
| 6,572,144 B1 | * | 6/2003 | Igawa ..................... 280/743.1 |

FOREIGN PATENT DOCUMENTS

| | | |
|---|---|---|
| DE | 1780224 | 4/1972 |
| DE | 19646698 | 5/1997 |
| DE | 29700804 | 5/1997 |
| DE | 29702441 | 7/1997 |
| DE | 19738842 | 3/1999 |
| DE | 19933586 | 1/2001 |
| DE | 20014705 | 2/2001 |
| DE | 19942886 | 3/2001 |
| EP | 0657329 | 6/1995 |
| EP | 0830991 | 3/1998 |
| EP | 0861762 | 9/1998 |
| JP | 03032956 | 2/1991 |
| JP | 07069149 | 3/1995 |
| WO | 93/16902 | 9/1993 |

* cited by examiner

*Primary Examiner*—Son T. Nguyen
(74) *Attorney, Agent, or Firm*—Tarolli, Sundheim, Covell & Tummino L.L.P.

(57) ABSTRACT

A gas bag for a vehicle occupant restraint system, which gas bag can be transferred from a folded condition into a deployed condition and comprises a first chamber which has an inflation opening, and a second chamber which is in flow connection with the first chamber. The first chamber is generally elongate in the deployed condition and the second chamber is connected with the first chamber at a side face of the first chamber, so that the gas bag is asymmetrical. A limiting strap is provided which extends across an outside of the second chamber and across part of an outside of the first chamber.

12 Claims, 3 Drawing Sheets

GAS BAG FOR A VEHICLE OCCUPANT RESTRAINT SYSTEM

TECHNICAL FIELD

This invention relates to a gas bag for a vehicle occupant restraint system, which gas bag can be transferred from a folded condition into a deployed condition and comprises a first chamber which has an inflation opening, and a second chamber which is in flow connection with the first chamber. The invention also relates to an assembly consisting of such gas bag and a vehicle body.

BACKGROUND OF THE INVENTION

Two-chamber gas bags of this type are known in a wide variety of embodiments. The first chamber can for instance be used as body chamber which restrains the torso of a vehicle occupant, and the second chamber can be allocated to other parts of the body.

The object of the invention consists in further developing a known two-chamber gas bag in such a manner that the restraining effect provided for the vehicle occupant is improved.

BRIEF SUMMARY OF THE INVENTION

According to the invention there is provided a gas bag for a vehicle occupant restraint system, which gas bag can be transferred from a folded condition into a deployed condition and comprises a first chamber which has an inflation opening, and a second chamber which is in flow connection with the first chamber. The first chamber is generally elongate in the deployed condition and the second chamber is connected with the first chamber at a side face of the first chamber, so that the gas bag is asymmetrical. A limiting strap is provided which extends across an outside of the second chamber and across part of an outside of the first chamber. The second chamber, which is asymmetrically arranged as "ear" on the first chamber, offers a restraining effect especially for one side of the head of a vehicle occupant. The limiting strap, which extends approximately transverse to the longitudinal direction of the second chamber and, in the deployed condition of the gas bag, at least partly at a distance from the first chamber, forms a special impact surface for the head of the vehicle occupant, which after the impact of the head of the vehicle occupant draws the second chamber towards the head of this vehicle occupant.

The gas bag according to the invention is arranged in a vehicle in such a manner that the second chamber faces an A-pillar of the vehicle body. In the case of a driver gas bag for a vehicle with the steering wheel on the left side, the second chamber, as seen in direction of travel, is disposed on the left side of the gas bag, and in the case of a passenger gas bag, the second chamber is disposed on the right side of the gas bag. With this arrangement, the forces acting on the vehicle occupant in the case of an accident have been taken into account, in particular the movements resulting from the use of a usual 3-point safety belt and the movements resulting from a possible rotation of the vehicle during an accident. The safety belt extends at an angle from that shoulder of the vehicle occupant which faces the outside of the vehicle, and across the chest towards the pelvis. This results in a very large restraining effect for the shoulder facing the outer side of the vehicle, whereas the shoulder lying on the inner side is restrained less. In the case of a strong deceleration, the upper region of the chest experiences a movement which is slightly directed towards the outside of the vehicle. The result is that the head of the vehicle occupant tends to be displaced towards the A-pillar. The second chamber disposed on the outside of the first chamber of the gas bag according to the invention counteracts such displacement in a particularly advantageous manner.

Advantageous aspects of the invention can be taken from the sub-claims.

DETAILED DESCRIPTION OF THE PREFERRED EMBODIMENT

The gas bag 10 has a first chamber 12 and a second chamber 14. The first chamber generally is elongate and, as can be seen in particular in FIG. 2, slightly waisted, and the second chamber 14 is laterally attached to the first chamber 12 in the manner of an ear. With respect to the mounting position of the deployed gas bag shown in FIG. 2, the second chamber is placed against the upper end of the first chamber. There is a flow connection between the first chamber 12 and the second chamber 14 of the gas bag, so that compressed gas, which flows into the first chamber through an inlet opening 16, in part also flows into the second chamber and deploys the same.

Figure 1:
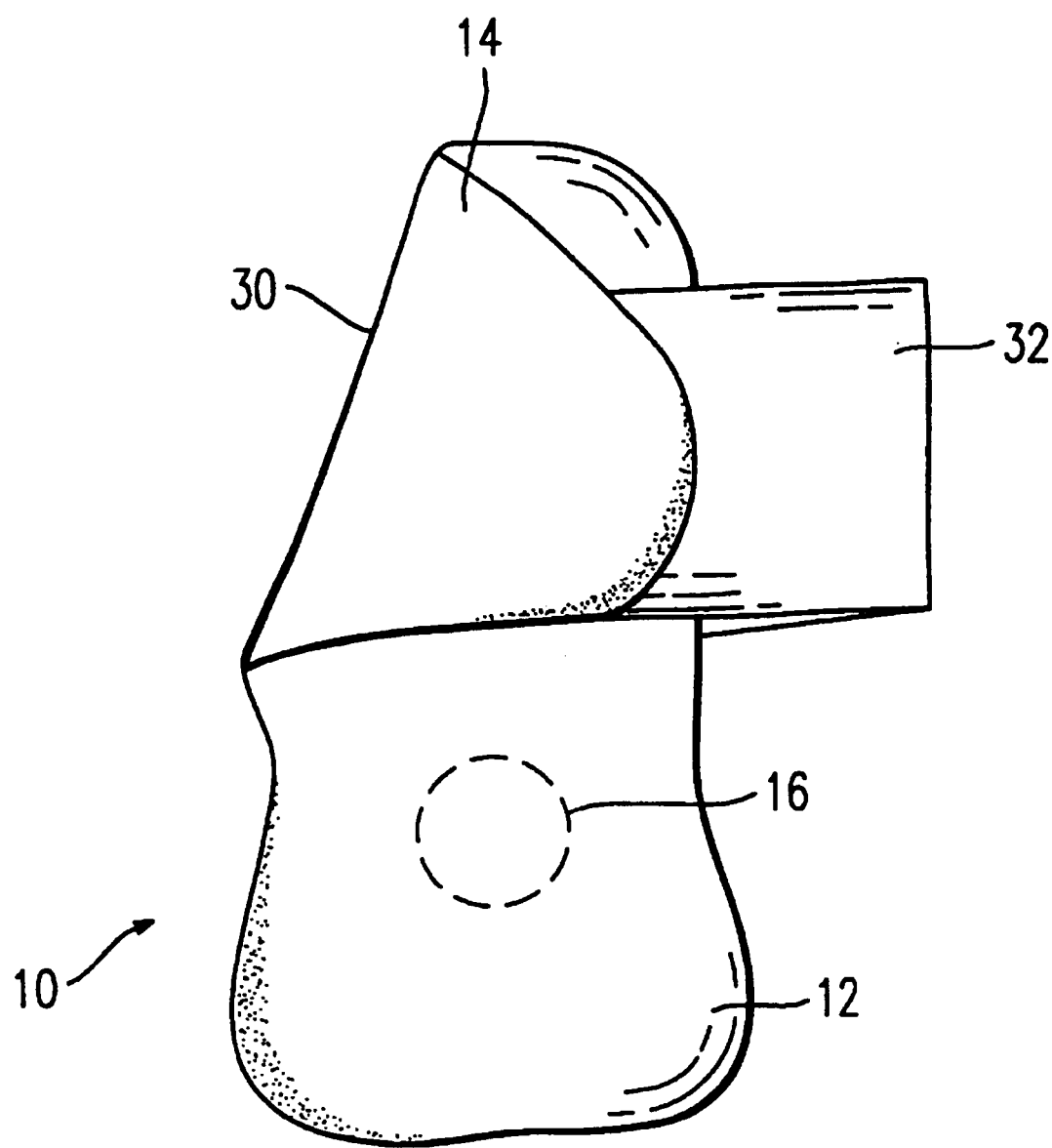
FIG. 1 shows a gas bag in the unpressurized, flatly spread condition.
Figure 2:
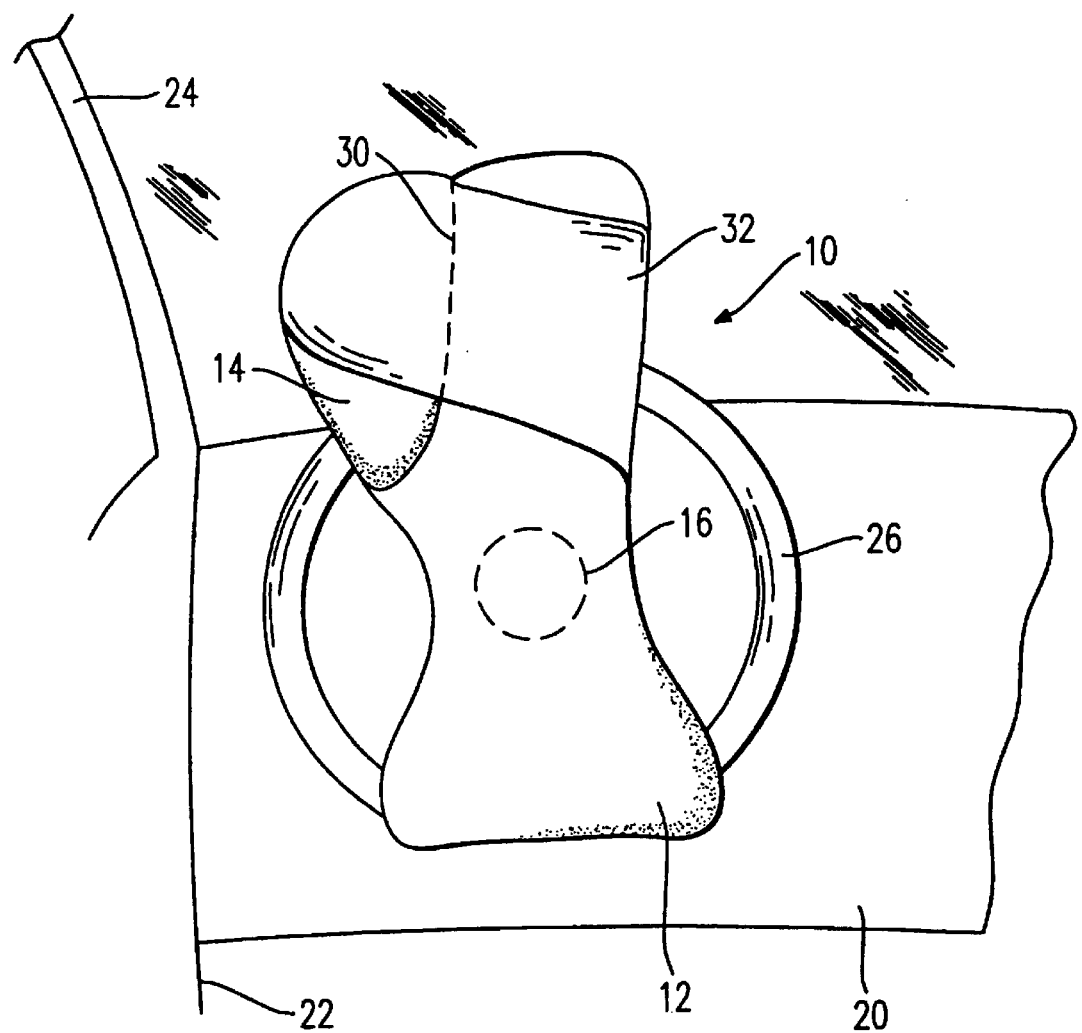
FIG. 2 shows a gas bag according to the invention in the deployed condition in a schematically illustrated vehicle.

In FIG. 2, the gas bag is shown installed in a vehicle, of which segments of a part of a dashboard 20, a part of a vehicle door 22 and an A-pillar 24 are shown here. The gas bag 10 is part of a driver gas bag module, which is mounted in a steering wheel 26. To ensure that in the deployed condition the gas bag is always positioned in the same orientation relative to the driver to be restrained, independent of a rotation of the steering wheel, the gas bag module is rotatably mounted on the steering wheel 26 such that the longitudinal direction of the first chamber of the deployed gas bag always extends vertically. Such gas bag module is described in the German Utility Model 297 02 441, to the disclosure of which reference is made in this connection.

Figure 3:
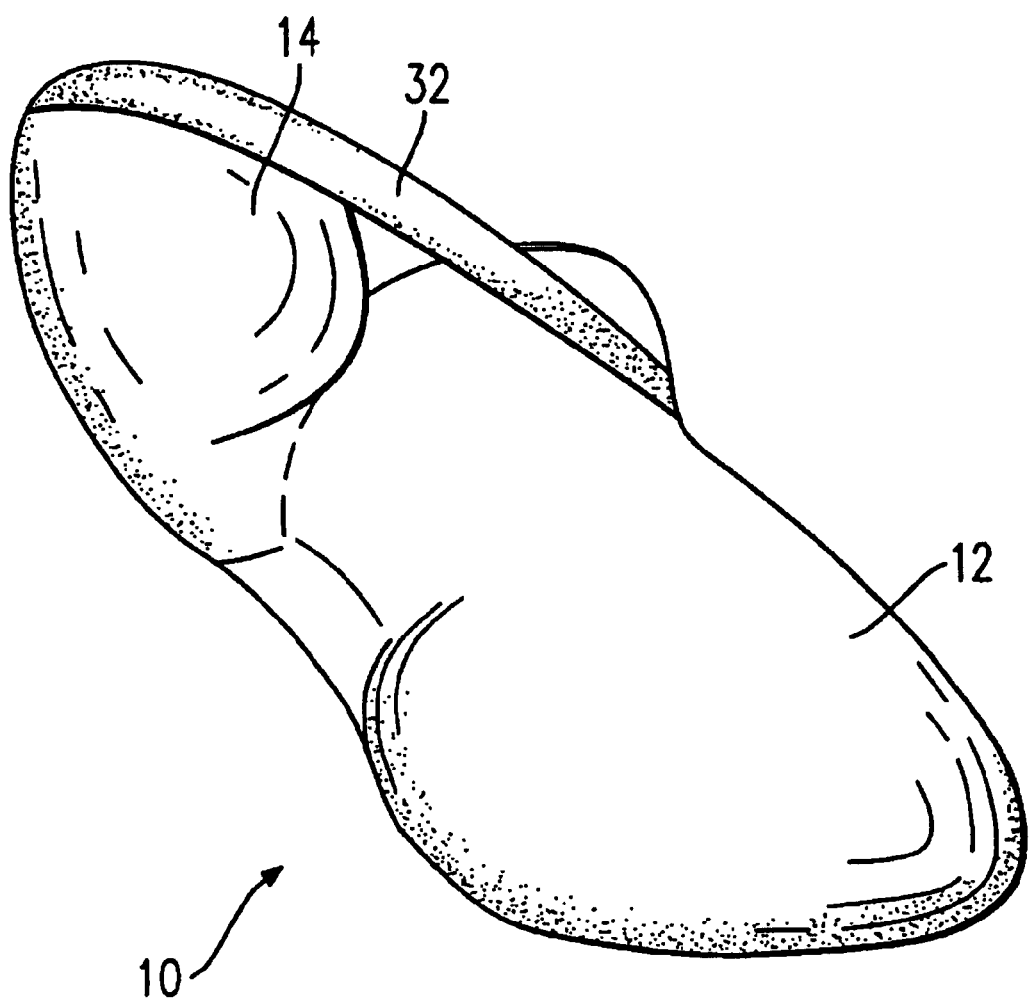
FIG. 3 shows a perspective view of the deployed gas bag of FIG. 2.

The connecting line 30 between the first chamber 12 of the gas bag and the second chamber is designed like a hinge, so that the second chamber 14 can be folded down with respect to the first chamber to a limited extent. On the outside of the gas bag a limiting strap 32 is mounted, which is connected with the second chamber 14 on the outside thereof, extends across the side of the second chamber facing the driver and across part of the surface of the first chamber 12, and is sewn to the first chamber on the outside thereof. The limiting strap 32 is made so short that with the gas bag deployed it draws the second chamber 14 towards the first chamber 12. This can be clearly seen in FIG. 3; the limiting strap 32 is so short that the chamber 14 is slightly folded down and in the vicinity of the transition from the second chamber 14 to the first chamber 12 the limiting strap 32 extends at a distance from the wall of the gas bag.

The limiting strap 32 acts as an intercepting or impact surface for the head of a vehicle occupant, and during the impact of the head of the vehicle occupant onto the limiting strap 32, the second chamber is drawn even more towards the middle of the gas bag and the first chamber. There is thus obtained an improved support for the head of the vehicle occupant on the side facing the A-pillar 24, so that a contact between A-pillar and head of the vehicle occupant is reliably prevented.

In an alternative embodiment, the gas bag can also be used on the passenger side. In this case, the second chamber 14 is mounted mirror-inverted at the first chamber 12, so that it in turn lies on that side of the gas bag which faces the outside of the vehicle body and thus the A-pillar. In such passenger gas bag module, the attachment of the gas bag module is simplified, as the module can be mounted in the dashboard so as to be stationary.

In vehicles with the steering wheel on the right side of the vehicle, the gas bag is of course designed mirror-inverted with respect to the above embodiments, i.e. on the driver side with the second chamber 14 on the right side of the gas bag and on the passenger side with the second chamber on the left side of the gas bag.

What is claimed is:

1. A gas bag for a vehicle occupant restraint system, said gas bag being transferable from a folded condition into a deployed condition and comprising: a first chamber having an inflation opening and being generally elongate in said deployed condition, a second chamber being in flow connection with said first chamber and being connected with said first chamber at a side face of said first chamber, so that said gas bag is asymmetrical, and a limiting strap limiting movement of said second chamber relative to said first chamber, said limiting strap extending from an outside portion of said first chamber to an outside portion of said second chamber and facing the heat of an occupant, wherein the occupant moving towards said gas bag directly contacts said limiting strap when said gas bag is in said deployed condition.

2. The gas bag as claimed in claim 1, wherein said limiting strap extends approximately transverse to a longitudinal direction of said second chamber.

3. The gas bag as claimed in claim 1, wherein said second chamber is attached to said first chamber in the manner of a hinge, so that said second chamber can be folded down with respect to said first one.

4. The gas bag as claimed in claim 1, wherein in said deployed condition of said gas bag said limiting strap extends at least partly at a distance from said first chamber.

5. The gas bag as claimed in claim 1, wherein said limiting strap extends in front of said first and second chambers such that the head of the occupant moving towards said gas bag contacts said limiting strap when said gas bag is in said deployed condition.

6. The gas bag as claimed in claim 1, wherein said second chamber is connected with said first chamber at a side face of said first chamber along a connecting line, said limiting strap extending across said connecting line.

7. An assembly comprising a gas bag and a vehicle body, said gas bag being transferable from a folded condition into a deployed condition and comprising: a first chamber having an inflation opening and being generally elongate in said deployed condition, a second chamber being in flow connection with said first chamber and being connected with said first chamber at a side face of said first chamber, so that said gas bag is asymmetrical, and a limiting strap limiting movement of said second chamber relative to said first chamber, said limiting strap extending from an outside portion of said first chamber to an outside portion of said second chamber and facing the head of an occupant, wherein the occupant moving towards said gas bag directly contacts said limiting strap when said gas bag is in said deployed condition, said gas bag as regards its orientation being mounted stationary in said vehicle in said deployed condition, and said second chamber of said gas bag being disposed on that side of said gas bag which faces an A-pillar of said vehicle body.

8. The assembly as claimed in claim 7, wherein said gas bag is part of a driver gas bag module and said module is mounted at a vehicle steering wheel in such a manner that its orientation relative to said vehicle body is independent of a rotation of said steering wheel.

9. The assembly as claimed in claim 7, wherein said gas bag is part of a passenger gas bag module.

10. The assembly as claimed in claim 7, wherein said limiting strap extends in front of said first and second chambers such that the head of the occupant moving towards said gas bag contacts said limiting strap when said gas bag is in said deployed condition.

11. The assembly as claimed in claim 7, wherein said second chamber is connected with said first chamber at a side face of said first chamber along a connecting line, said limiting strap extending across said connecting line.

12. A gas bag for a vehicle occupant restraint system, said gas bag being transferable from a folded condition into a deployed condition and comprising: a first chamber having an inflation opening and being generally elongate in said deployed condition, a second chamber being in flow connection with said first chamber and being connected with said first chamber at a side face of said first chamber, so that said gas bag is asymmetrical, and a limiting strap limiting movement of said second chamber relative to said first chamber, said limiting strap extending from an outside portion of said first chamber to an outside portion of said second chamber and positioned between said gas bag and the head of an occupant, wherein upon deceleration of the vehicle and said gas bag being in said deployed condition, the head of the occupant directly contacts said limiting strap which causes said limiting strap to pull said second chamber toward said first chamber.

* * * * *